(12) United States Patent
Amezawa

(10) Patent No.: US 6,438,362 B1
(45) Date of Patent: Aug. 20, 2002

(54) METHOD AND APPARATUS FOR SIR MEASUREMENT

(75) Inventor: Yasuharu Amezawa, Tokyo (JP)

(73) Assignee: Oki Electric Industry CO, Ltd., Tokyo (JP)

(*) Notice: Subject to any disclaimer, the term of this patent is extended or adjusted under 35 U.S.C. 154(b) by 0 days.

(21) Appl. No.: 09/252,683

(22) Filed: Feb. 22, 1999

(30) Foreign Application Priority Data

Feb. 23, 1998 (JP) .......................................... 10-040096

(51) Int. Cl.$^7$ .............................................. H04B 17/00
(52) U.S. Cl. ................................ 455/226.3; 455/226.2; 455/67.3
(58) Field of Search .......................... 455/226.1, 226.3, 455/67.1, 67.3, 67.6, 424, 425, 226.2, 226.4; 375/224, 227

(56) References Cited

U.S. PATENT DOCUMENTS 5,574,984 A * 11/1996 Reed et al. ................. 455/67.1
5,787,338 A * 7/1998 Priest .......................... 455/69
5,903,554 A * 5/1999 Saints .......................... 370/342
6,034,952 A * 3/2000 Dohl ........................... 370/335

OTHER PUBLICATIONS

An Investigation on SIR Measurement Methods in Adaptive Transmit Power Control for DS–CDMA. Shunsuke SEO et al., 1996 NTT Mobile Communications Network Inc. (6 pages).
Adaptive RAKE Receiver for Mobile Communications. Yukitoshi Sanada et al., FEICE Trans. Commun., vol. E76–B., No. 8, Aug. 1993 pp. 1002–1007.

* cited by examiner

Primary Examiner—Vivian Chin
Assistant Examiner—James K Moore
(74) Attorney, Agent, or Firm—Rabin & Berdo, P.C.

(57) ABSTRACT

A method for measuring characteristics of a propagated radio-wave on the basis of a reference signal, wherein the reference signal is obtained by receiving and demodulating the propagated radio-wave, comprising the steps of: estimating characteristics of a propagation-path, through which the radio-wave has been transmitted, on the basis of the reference signal; determining a desired-signal power and an interference-signal power of the propagated radio-wave on the basis of the estimated characteristics: and deriving an SIR by performing calculations on the desired-signal power and the interference-signal power.

12 Claims, 1 Drawing Sheet

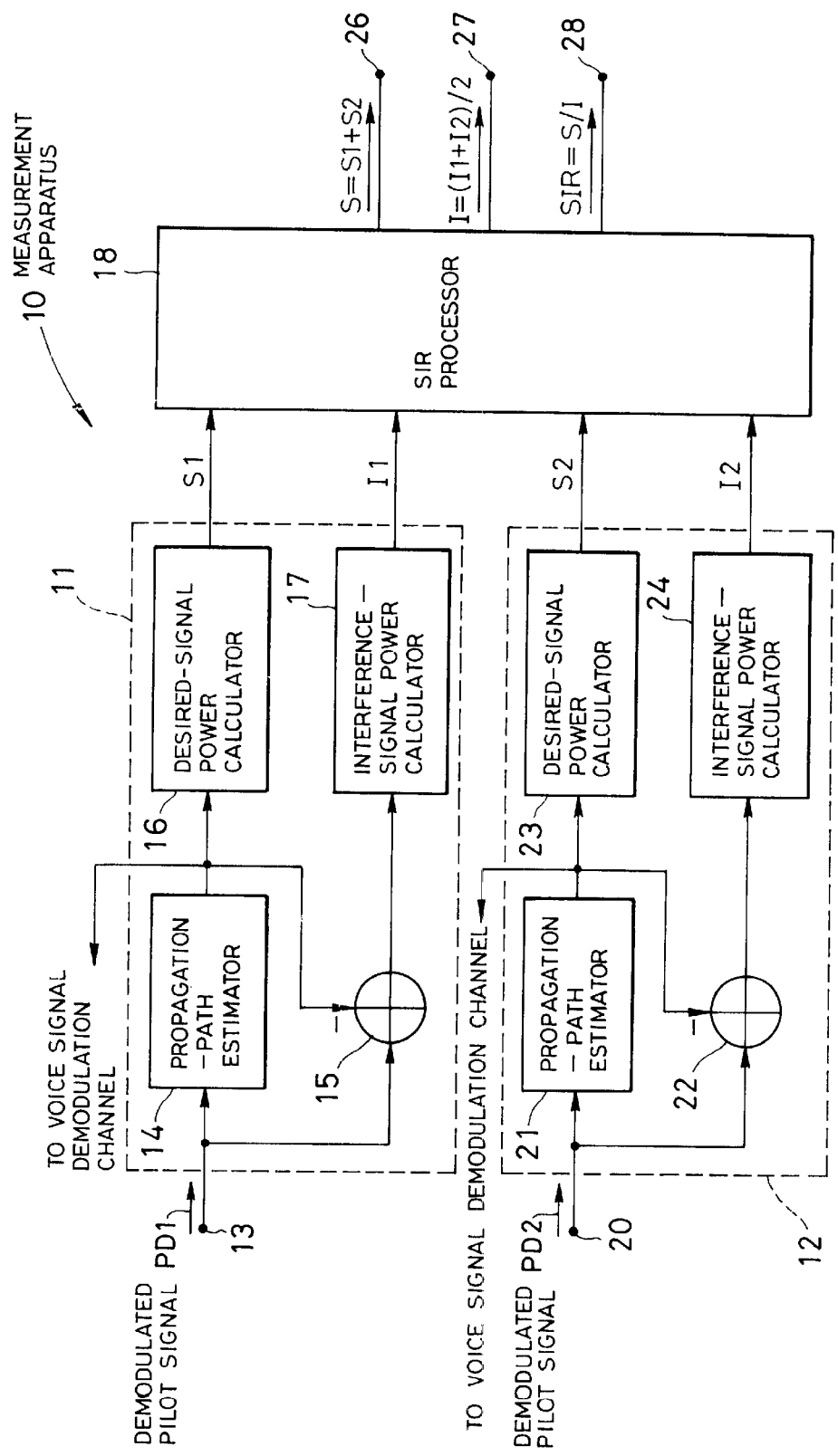

METHOD AND APPARATUS FOR SIR MEASUREMENT

BACKGROUND OF THE INVENTION

1. Field of the Invention

The present invention generally relates to measurement method and apparatus for measuring characteristics of a radio-wave, in particular, to a measurement technique for measuring a desired-signal power, an interference-signal power, and/or an SIR (signal-to-interference power ratio) in, for example, a diversity combining receiver/transceiver.

2. Description of the Related Art

A prior art of the SIR measuring method is disclosed by the following article:

"An Investigation on SIR Measurement Methods in Adaptive Transmit Power Control for DS-CDMA" by S. Seo, Y. Okumura and T. Dohi, Proc. Communications Society, The Institute of Electronics, Information and Communication Engineers (IEICE), B-330, pp. 331, 1996.

The above article describes an SIR measurement method. In the method, a desired-signal power is obtained from a square of an average value of the envelope of a received signal resulted from the diversity reception within a predetermined symbol-period, while an interference-signal power is obtained as a variance of the average value of the envelope of the diversity reception signal within a predetermined symbol-period. Then, SIR is calculated by obtaining a ratio between these signal powers. However, the method needs complicated calculation to obtain the desired-signal power and the interference-signal power. Since, furthermore, the desired-signal power is estimated as an averaged value of the received signal, the power cannot be measured with high accuracy. A problem in this method will be briefly described below.

A signal r1 received at a receiver channel 1 and a signal r2 received at a receiver channel 2 can be written as:

$$r1 = s1 + i1 \quad (1)$$

$$r2 = s2 + i2 \quad (2)$$

where s1, s2 and i1, i2 respectively represent the values of the desired-signal amplitude and the interference-signal amplitude contained in the received signals r1 and r2.

Combining r1 and r2, using a maximal-ratio combining method, gives:

$$s1(s1+i1)+s2(s2+i2)=s1^2+s2^2+s1*i1+s2*i2. \quad (3)$$

where "^2" denotes a square.

Now assume that $i1^2=i2^2=N0$ and the average values of i1 and i2 are equal to zero. The desired-signal power S' and the interference-signal power I' appearing in the article cited above are then given by the expressions:

$$S'=(s1^2+s2^2)^2 \quad (4)$$

$$I'=(s1^2+s2^2)*N0 \quad (5)$$

Hence, the signal-to-interference power ratio (SIR) can be written as:

$$S'/I'=(s1^2+s2^2)/N0 \quad (6)$$

However, S' and I' calculated above do not represent the respective actual or real values of the desired-signal power and the interference-signal power. The following calculation must be therefore performed in order to obtain the actual values:

$$S=sqrt(S') \quad (7)$$

$$I=I'/sqrt(S') \quad (8)$$

where "sqrt" denotes a square root.

Thus, this method requires complicated calculations to arrive at the actual values S and I for the desired-signal power and the interference-signal power, respectively.

It should be also noted that an averaging treatment over a long symbol-period is employed for obtaining an interference-signal power with high accuracy in the method described in the above-mentioned article. Since, however, the interference-signal power I' in Eq.(8) contains a time-varying term (s1^2+s2^2), the accuracy of the measurement will be reduced even with the long-period averaging. In order to avoid such problem, the desired-signal power S and the interference-signal power I must be determined exactly. It follows that the method has a drawback of requiring complicated calculations as mentioned above.

OBJECT AND SUMMARY OF THE INVENTION

It is an object of the present invention to provide method and apparatus for measuring radio-wave characteristics such as an SIR with high accuracy through a simple calculation process.

To achieve the above object, the present invention provides, in a first aspect, a method for measuring characteristics of a propagated radio-wave on the basis of a reference signal, wherein the reference signal is obtained by receiving and demodulating the propagated radio-wave. The method comprises the steps of: (1) within a signal-processing channel, estimating characteristics of a propagation-path through which the radio wave has transmitted, on the basis of the reference signal, and (2) determining radio-wave characteristics on the basis of the estimated characteristics.

The present invention further provides, in a second aspect, a method comprising the steps of: (1) within a signal-processing channel, estimating characteristics of a propagation-path through which the radio wave has transmitted, on the basis of the reference signal, (2) determining a first radio-wave characteristic on the basis of the estimated characteristics, and (3) within the respective signal-processing channels, calculating a difference value between the estimated characteristics and the reference signal so as to obtain a second radio-wave characteristic.

The present invention also provides, in a third aspect, a method further comprising the step of deriving a third radio-wave characteristic from the radio-wave characteristics calculated in the respective signal-processing channels.

In a further aspect, the present invention provides either a receiver or a transceiver that performs either one of the foregoing methods.

BRIEF DESCRIPTION OF THE DRAWING

FIG. 1 is a block diagram illustrating a configuration of a CDMA portable-telephone of a preferred embodiment according to the present invention.

DETAILED DESCRIPTION OF AN EMBODIMENT

A CDMA portable-telephone device of a preferred embodiment according to the invention will be hereinafter described in detail with reference to the accompanying drawing.

For simplicity, the ensuing description assumes that an unmodulated pilot signal is transmitted by way of a control channel, while voice signal is transmitted by way of an information channel, which is different from the control channel. It should be noted that the particular portable-telephone device employs a maximal-ratio combining method, wherein two received signals are demodulated by demodulators and then combined together.

FIG. 1 illustrates a configuration of a measurement apparatus 10 of the preferred embodiment according to the present invention, which is installed in a CDMA portable-telephone device. The apparatus 10 has two signal-processing channels 11, 12 for measuring radio-wave characteristics. The apparatus 10 and voice/pilot signal demodulators (not shown) share the use of propagation-path estimators 14, 21. The portable-telephone device, therefore, is provided with two voice/pilot signal demodulators respectively corresponding to the channels 11, 12.

Referring to FIG. 1, a first voice/pilot signal is received by a first receiving antenna (not shown) and is demodulated by the voice/pilot signal demodulator (not shown). A pilot signal PD1 resulted from the demodulation is then supplied to an input terminal 13 of the signal-processing channel 11. The input terminal 13 is connected to input terminals of the estimator 14 and a subtracter 15.

The estimator 14, which is a part of the demodulator, estimates propagation-path characteristics and supplies the estimated value of the propagation-path to the subtracter 15 and the desired-signal power calculator 16. Also, the estimator 14 feeds back the estimated value to a demodulation channel in the demodulator. The demodulator in turn demodulates a voice signal received at the first antenna on the basis of the estimated value.

The estimator 14 obtains the estimated value using a moving-averages method, wherein an averaging is executed over a predetermined number of the latest data in the pilot signal PD1 input thereto one after another. In the moving-averages method, the predetermined number of data, on which averaging is executed, is updated in the manner that the oldest data is abandoned each time the latest data is added.

It should be noted that the teaching of this invention is not limited for use of the moving-averages method. That is, the estimated value can be obtained employing, by example, a least-squares method or a filtering method. For example, propagation-path characteristics can be estimated with high accuracy by employing a filtering method. In the filtering method, a filter having a frequency characteristic is used, which characteristic is flat up to a maximum Doppler-frequency allowed in a system and causes steep attenuation at a higher frequency than this frequency.

The estimated value represents the characteristics of the propagation-path, through which a radio wave is transmitted between a base station and a receiving antenna, and includes information about an envelope and a phase rotation of the radio-wave in such a form that includes a real part and an imaginary part of a complex quantity.

The subtracter 15, provided with the estimated value, obtains a difference value by subtracting the estimated value from the demodulated pilot signal PD1. Then, the subtracter 15 supplies the difference value to the interference-signal power calculator 17. The interference-signal power calculator 17 averages the difference by using a weighted averaging technique with a forgetting factor so as to improve the accuracy of the interference-signal power. The calculator 17 then outputs the averaged difference as an interference-signal power I1, which is a value before combining for the diversity. It should be noted that the employment of the forgetting factor in the processing technique mentioned above not only improves the accuracy of the interference-signal power I1 but also enhances the trackability to the fluctuations in property of the propagation-path.

It should be further noted that the averaging method to be utilized in the calculator 17 is not limited to the weighted-averaging method mentioned above.

The desired-signal power calculator 16 determines a desired-signal power S1 within the received power, on the basis of the estimated value. For example, a propagation-path estimate, c, is obtained as $c=\Sigma r=\Sigma(s+i)$, when the moving-averages method is employed in the propagation-path estimator 14 for the received signal, $r=s+i$. The calculator 16 then performs an averaging calculation on the estimate to obtain the received-signal power, $S1=(\Sigma c)^2$. Alternatively, the averaging calculation, $S1=\Sigma(c^2)$, may be employed in the calculator 16.

To the SIR processor 18 are supplied from the desired-signal power calculator 16 and the interference-signal power calculator 17 the desired-signal power S1 and the interference-signal power I1, respectively.

The desired-signal power S1 corresponds to the power of the signal s1 in Eqs.(1)–(6). Similarly, the interference-signal power I1 corresponds to the power of the signal i1 in Eqs.(1)–(6).

With regard to the signal-processing channel 12, a second voice/pilot signal is received by a second antenna (not shown) and is demodulated by the voice/pilot signal demodulator, thereby to produce the pilot signal PD2 which is then supplied to an input terminal 20 of the signal-processing channel 12. The input terminal 20 is connected to input terminals of the estimator 21 and a subtracter 22.

The signal processing channel 12 comprises an estimator 21, a subtracter 22, a desired-signal power calculator 23 and an interference-signal calculator 24 which respectively correspond to the estimator 14, the subtracter 15, the desired-signal power calculator 16 and the interference-signal calculator 17 contained in the channel 11. The interconnection and operation of these elements in the channel 12 are equivalent to those of the corresponding elements in the signal-processing channel 11 as mentioned above.

Accordingly, both of the desired-signal power S2 output from the calculator 23 and the interference-signal power I2 output from the calculator 24 are supplied to the SIR processor 18. The estimated value output from the estimator 21 is also fed back to a voice-signal demodulation channel in the second voice/pilot signal demodulator. The second demodulator demodulates a voice signal received at the second antenna, which receives the pilot signal PD2, on the basis of the estimated value.

The SIR processor 18 receives the signals S1, I1, S2 and I2 from the signal-processing channels 11, 12 to execute combining and calculation. The desired-signal power S and the interference-signal power I are obtained by simple calculation and given by $S=S1+S2$, $I=(I1+I2)/2$.

The desired-signal power S corresponds to S appearing in Eq.(7) and the interference-signal power I corresponds to I appearing in Eq.(8), since they are the power values after combining. As a result, signal-to-interference ratio SIR can be easily obtained by simple calculation of $SIR=S/I$.

It should be noted that the calculation, i.e. $I=(I1+I2)/2$, executed in the processor 18, can be replaced by $I\approx I1(2\text{б}I2)$. This further simplifies the calculation for obtaining the SIR.

Then, the desired-signal power S and the interference-signal power I after combining are output from the output terminals 26, 27 of the SIR processor 18, respectively. The ratio SIR, calculated from the powers S and I, is output from an output terminal 28. On the basis of the SIR value, transmission-power of the portable-telephone may be controlled.

In case only an SIR value is required, the output terminals 26, 27 can be omitted. When only a desired-signal power S is required, the output terminals 28, the subtracter 15, 22 and the interference-signal calculator 17, 24 can be omitted and unnecessary portions of calculation in the SIR processor 18 can be eliminated.

Furthermore, in case only an interference-signal power I is required, unnecessary elements or portions can be omitted in a similar manner as described above.

Being apparent from the above, the amounts of desired-signal power and the interference-signal power are obtained for the respective signal-processing channels prior to the diversity combining, and then the desired-signal power S, the interference-signal power I and the SIR after the diversity combining are calculated according to the desired types of the diversity combining method.

In this instance, the accurate envelope information produced in the propagation-path estimators which may be disposed in the demodulator is utilized, thereby to obtain accurate values of the desired-signal power S and the interference-signal power I without using complicated calculation.

Since, furthermore, exact values of the interference-signal power are obtained for the respective received signals (signal-processing channels), there is no need for complicated calculation even when an averaging method over long symbol-period is employed.

Since, still further, the desired-signal power and the interference-signal power before combining are obtained by utilizing the propagation-path estimators, which is included in the demodulator for demodulating voice signal, there is no need for an additional circuit for obtaining the envelope information. Furthermore, the propagation-path estimators are essentially designed for demodulating voice signal so that it produces accurate estimate values. Consequently, the desired-signal power and the interference-signal power before combining, which are calculated on the basis of the estimate values, are of high accuracy.

While in the aforementioned embodiment, a maximal-ratio combining method is employed, the teaching of this invention is not limited to this particular method. Alternatively, by example, a selective combining method may be applied. In this case, employing SIR calculation suitable for the applied method can attain the object of the invention.

Also, in the preferred embodiment, the pilot signal (reference-signal) to be combined is provided separately from the voice-signal (information-signal), it is possible to measure radio-wave characteristics by utilizing all or a portion of the information-signal. That is, the term "reference-signal" should be understood in a broad sense that includes "information-signal" in some cases.

While the preferred embodiment has been described above with regard to two signal-processing channels, more than two channels or a single channel can be used. That is, the teaching of this invention is not limited to a particular diversity technique. For example, a path-diversity or a polarization-diversity as well as a space-diversity can be employed. Furthermore, a diversity technique is not necessarily required. The teaching of this invention may also be applicable to a single-channel receiver employing, for example, a synchronous detection technique.

Also, in the preferred embodiment, the pilot signal is transmitted through a control channel separately from an information channel, the pilot signal may be inserted in an information channel on an intermittent basis to be transmitted therethrough.

While in the present embodiment described above, the propagation-path estimators included in the demodulator for demodulating voice signals are employed, additional estimators may be installed.

Furthermore, the present invention can be applied not only to a portable-telephone but also to the other types of mobile telephone or to base-stations. In this case, the output of the measurement apparatus can be utilized for transmission-power control of the mobile telephone or the base-station, or for the other purpose.

It should be understood that the teaching of this invention is not limited for use with the apparatus having transmitting and receiving function, such as a mobile telephone or a base-station. The present invention can be readily applied to, for example, measurement equipment for solely measuring radio-wave characteristics.

While the present invention has been particularly described with respect to three kinds of radio-wave characteristics, it should be realized that the teaching of this invention may also be applied to the other kinds of radio-wave characteristics, by example, signal-to-noise ratio, signal-to-interference noise ratio and decision error power.

Consequently, the teaching of this invention can be applied to the method and apparatus for measuring propagated radio-wave characteristics on the basis of the reference signal, which is obtained by receiving and demodulating the propagated radio wave.

According to the present invention described above, measurement of radio-wave characteristics with high accuracy can be performed quite easily with a simple calculation.

While the invention has been particularly shown and described with respect to the preferred embodiments thereof, it should be understood by those skilled in the art that various other modifications may be made to the illustrated embodiments without departing from the scope and the spirit of the invention as described in the specification and defined in the appended claims.

What is claimed is:

1. An apparatus for measuring characteristics of a propagated radio-wave on the basis of a reference signal, comprising:

a plurality of signal-processing channels each including:
    obtaining means for obtaining a reference signal by demodulating the propagated radio-wave;
    estimating means for estimating characteristics of a propagation-path, through which said propagated radio-wave has been transmitted, on the basis of the reference signal;
    determining means for determining a first signal power of said propagated radio-wave on the basis of the estimated characteristics;
    calculating means for calculating a second signal power of said propagated radio-wave on the basis of a difference value between the estimated characteristics and the reference signal intensity;
summing means for summing the first signal powers determined in said determining means within said plurality of signal-processing channels to obtain a first radio-wave characteristic; and
averaging means for averaging the second signal powers calculated in said calculating means within said plurality of signal-processing channels to obtain a second radio-wave characteristic.

2. An apparatus according to claim 1, further comprising:

dividing means for dividing said first radio-wave characteristic by said second radio-wave characteristic to obtain a third radio-wave characteristic.

3. An apparatus according to claim 2, further comprising:

transmitting means for transmitting a signal; and a controller for controlling transmission power of said transmitting means according to said third radio-wave characteristic.

4. An apparatus for measuring characteristics of a propagated radio-wave, comprising:

a plurality of signal-processing channels each including:
obtaining means for obtaining a reference signal by demodulating the propagated radio-wave;
estimating means for estimating characteristics of a propagation-path, through which said propagated radio-wave has been transmitted, on the basis of the reference signal;
determining means for determining a first signal power of said propagated radio-wave on the basis of the estimated characteristics;
calculating means for calculating a second signal power of said propagated radio-wave on the basis of a difference value between the estimated characteristics and the reference signal intensity;

summing means for summing the first signal powers determined in said determining means within said plurality of signal-processing channels to obtain a first radio-wave characteristic; and selecting means for selecting a single signal power among the second signal powers calculated in said calculating means within said plurality of signal-processing channels as a second radio-wave characteristic.

5. An apparatus according to claim 4, further comprising:

dividing means for dividing said first radio-wave characteristic by said second radio-wave characteristic to obtain a third radio-wave characteristic.

6. An apparatus according to claim 5, further comprising:

transmitting means for transmitting a signal; and a controller for controlling transmission power of said transmitting means according to said third radio-wave characteristic.

7. A method for measuring characteristics of a propagated radio-wave, the propagated radio-wave being received by a plurality of signal-processing channels, comprising the steps of:

within each of said plurality of signal-processing channels,
obtaining a reference signal by demodulating the propagated radio-wave;
estimating characteristics of a propagation-path, through which said propagated radio-wave has been transmitted, on the basis of the reference signal;
determining a first signal power of said propagated radio-wave on the basis of the estimated characteristics;
calculating a second signal power of said propagated radio-wave on the basis of a difference value between the estimated characteristics and the reference signal intensity;

summing the first signal powers determined in the determining step within said plurality of signal-processing channels to obtain a first radio-wave characteristic; and averaging the second signal powers calculated in the calculating step within said plurality of signal-processing channels to obtain a second radio-wave characteristic.

8. A method according to claim 7, further comprising the step of:

dividing the first radio-wave characteristic by said second radio-wave characteristic to obtain a third radio-wave characteristic.

9. A method according to claim 8, further comprising the step of:

transmitting a signal while controlling transmission power of said signal according to said third radio-wave characteristic.

10. A method for measuring characteristics of a propagated radio-wave, the propagated radio-wave being received by a plurality of signal-processing channels, comprising the steps of:

within each of said plurality of signal-processing channels,
obtaining a reference signal by demodulating the propagated radio-wave;
estimating characteristics of a propagation-path, through which said propagated radio-wave has been transmitted, on the basis of the reference signal;
determining a first signal power of said propagated radio-wave on the basis of the estimated characteristics;
calculating a second signal power of said propagated radio-wave on the basis of a difference value between the estimated characteristics and the reference signal intensity;

summing the first signal powers determined in the determining step within said plurality of signal-processing channels to obtain a first radio-wave characteristic; and selecting a single signal power among the second signal powers calculated in the calculating step within said plurality of signal-processing channels as a second radio-wave characteristic.

11. A method according to claim 10, further comprising the step of:

dividing said first radio-wave characteristics by said second radio-wave characteristics to obtain a third radio-wave characteristic.

12. A method according to claim 11, further comprising the step of:

transmitting a signal while controlling transmission power of said signal according to said third radio-wave characteristic.

* * * * *